United States Patent [19]
Cronin, II et al.

[11] Patent Number: 5,772,373
[45] Date of Patent: *Jun. 30, 1998

[54] NUT AND LOCKING DEVICE

[75] Inventors: Philip J. Cronin, II, Gladstone; Lonnie G. Williams, Jr., Portland; Thomas F. Dunlap, West Linn, all of Oreg.; David C. Wood, Vancouver, Wash.; Jon A. Bigley, Canton, Mich.; Stuart Miller, Carlton; James D. Hensley, Clackamas, both of Oreg.

[73] Assignee: Warn Industries, Inc., Milwaukie, Oreg.

[*] Notice: The term of this patent shall not extend beyond the expiration date of Pat. No. 5,618,143.

[21] Appl. No.: 560,629

[22] Filed: Nov. 20, 1995

Related U.S. Application Data

[63] Continuation-in-part of Ser. No. 333,500, Nov. 2, 1994, Pat. No. 5,618,143.

[51] Int. Cl.[6] .................................................. F16B 39/10
[52] U.S. Cl. ......................... 411/120; 411/220; 411/948; 411/955; 81/461
[58] Field of Search ................................... 411/197, 198, 411/191, 190, 119–121, 149, 150, 955, 953, 153, 152, 220, 948; 81/461, 176.15, 176.2

[56] References Cited

U.S. PATENT DOCUMENTS

| | | | |
|---|---|---|---|
| 613,776 | 11/1898 | Plain | 411/197 |
| 712,905 | 11/1902 | Cannon | 411/221 |
| 1,040,215 | 10/1912 | Kriner | 411/197 |
| 1,081,631 | 12/1913 | Siever | 411/198 |
| 1,140,974 | 5/1915 | Formby | 411/115 |
| 1,150,362 | 8/1915 | Hascall | 411/198 |
| 1,543,282 | 6/1925 | De Loe | 411/197 |
| 1,611,408 | 12/1926 | Bowers | 411/198 |
| 1,653,531 | 12/1927 | Affleck et al. | |
| 2,830,480 | 4/1958 | Brame | 81/90 |
| 2,909,090 | 10/1959 | Moore | 81/176.15 |
| 3,208,493 | 9/1965 | Holmes | 411/322 |
| 3,307,893 | 3/1967 | Williams | 384/585 |
| 3,768,345 | 10/1973 | Barnes | 81/176.15 |
| 3,851,690 | 12/1974 | Wing | 411/190 |
| 3,866,650 | 2/1975 | Larkin | 151/21 |
| 3,942,570 | 3/1976 | Bochman | 411/220 |
| 4,210,372 | 7/1980 | McGee | 384/584 |
| 4,812,094 | 3/1989 | Grube | 411/134 |
| 5,180,265 | 1/1993 | Wiese | 411/150 |

Primary Examiner—Steven N. Meyers
Assistant Examiner—Tuyet-Phuong Pham
Attorney, Agent, or Firm—Robert L. Harrington

[57] ABSTRACT

A spindle nut and a locking device are disclosed for securing the nut on a spindle in a non-rotative position relative to the spindle. The assembly comprises the spindle nut, an antirotation spring and a spring backup plate mounted on the spindle. The antirotation spring and spring backup plate may be formed as a single unit.

19 Claims, 4 Drawing Sheets

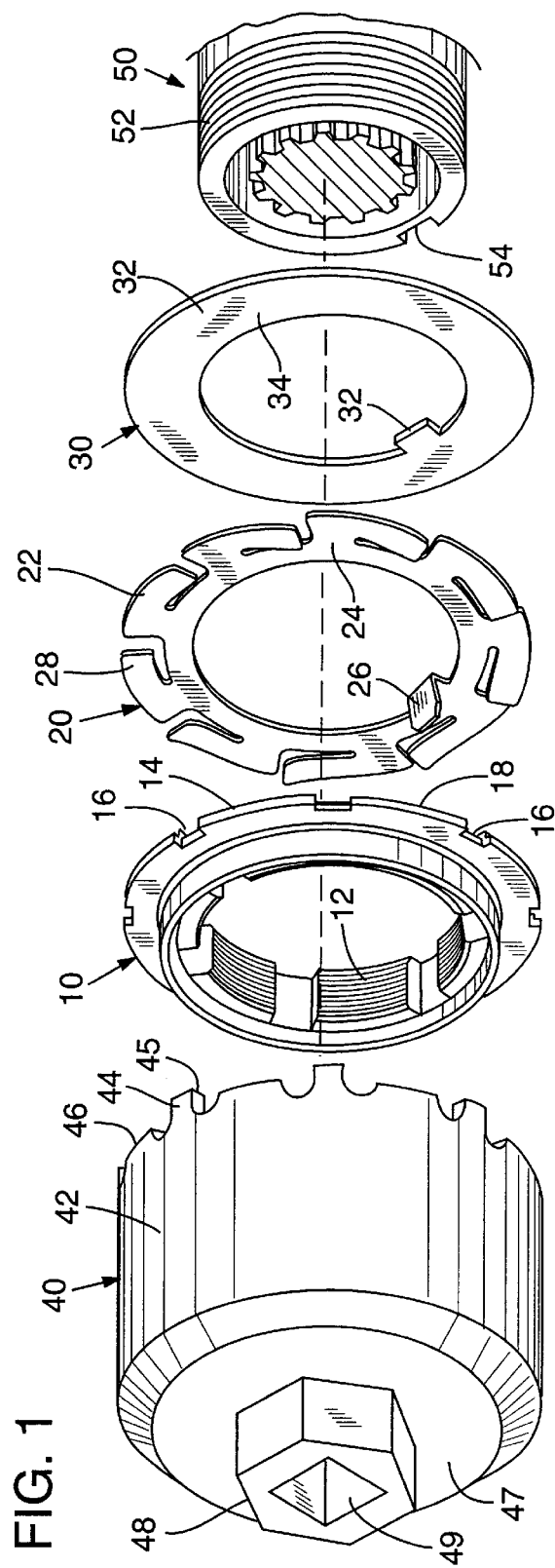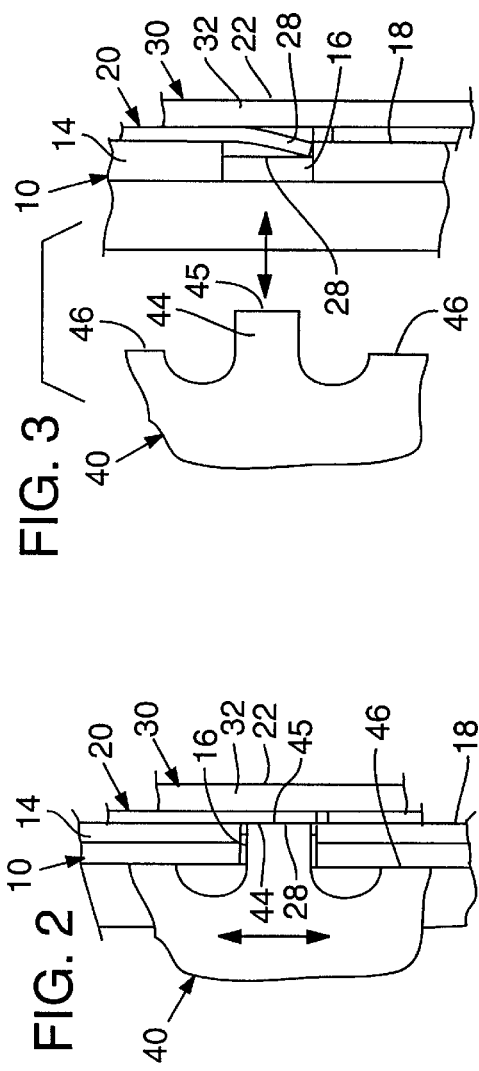

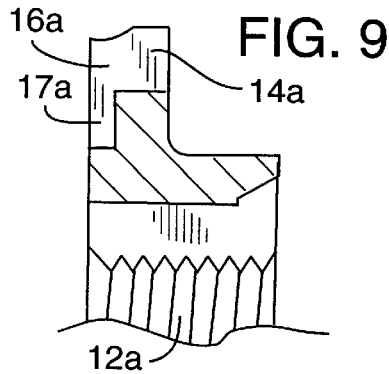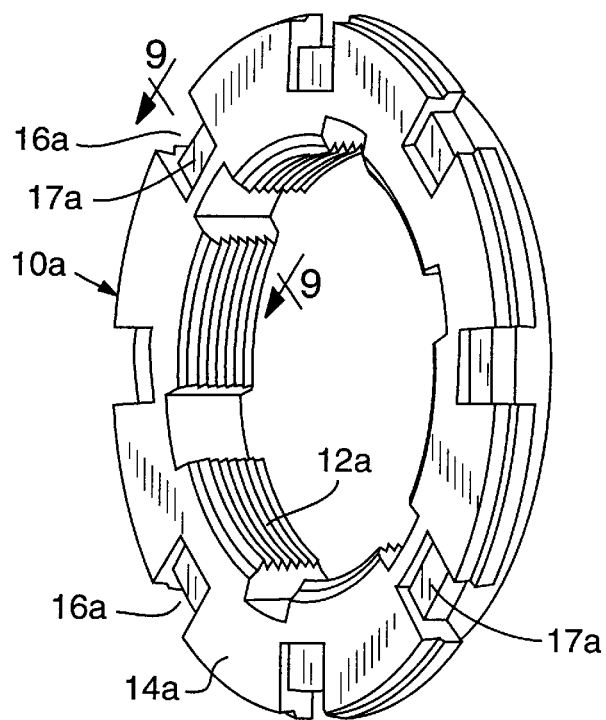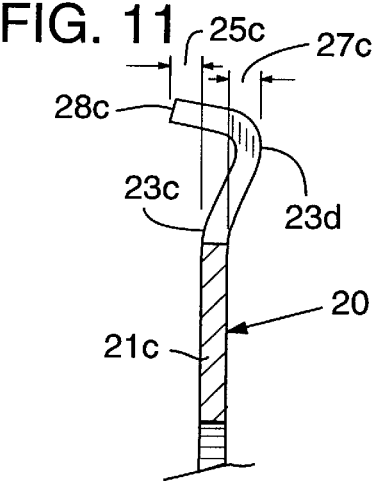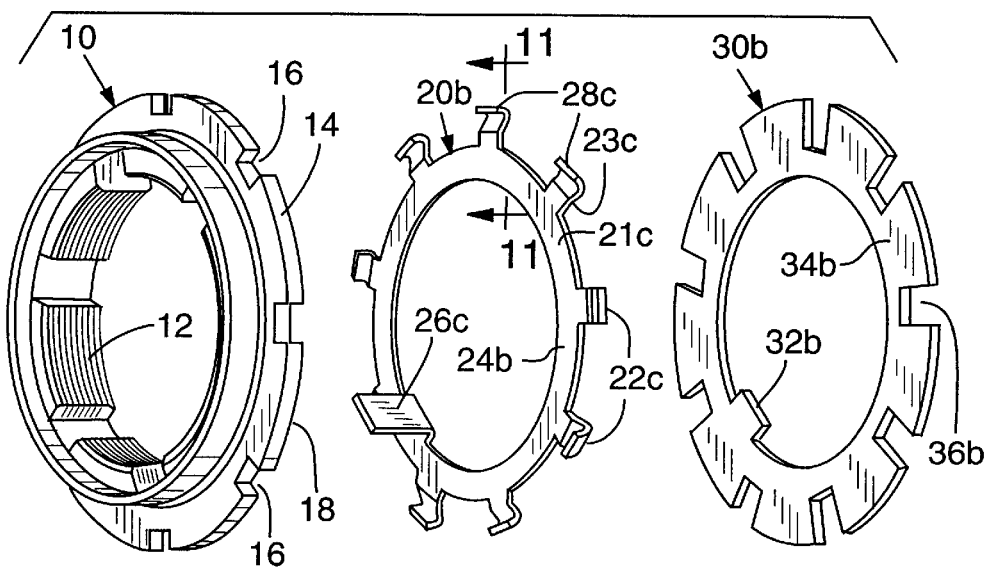

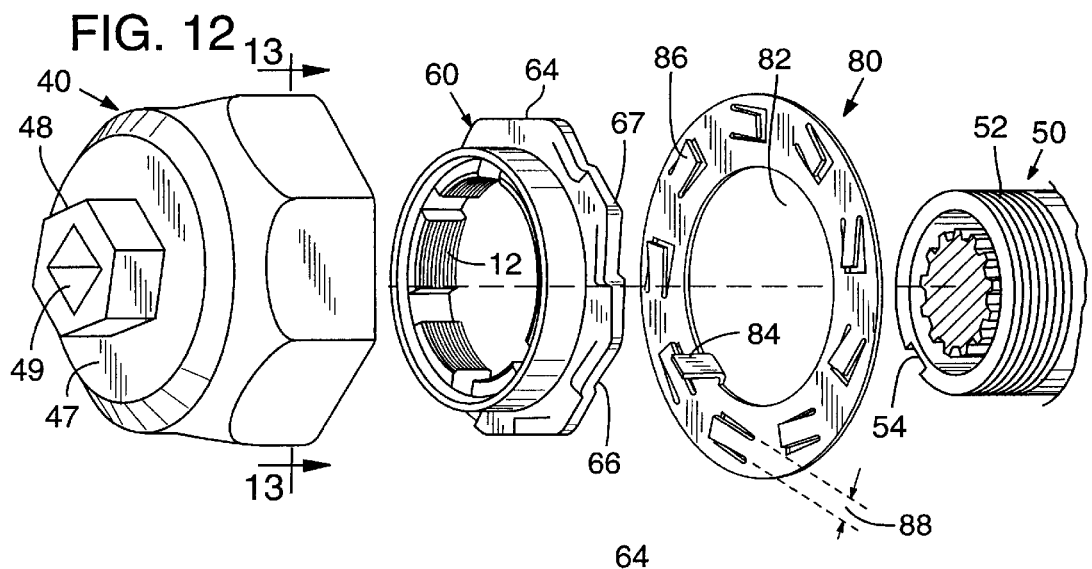
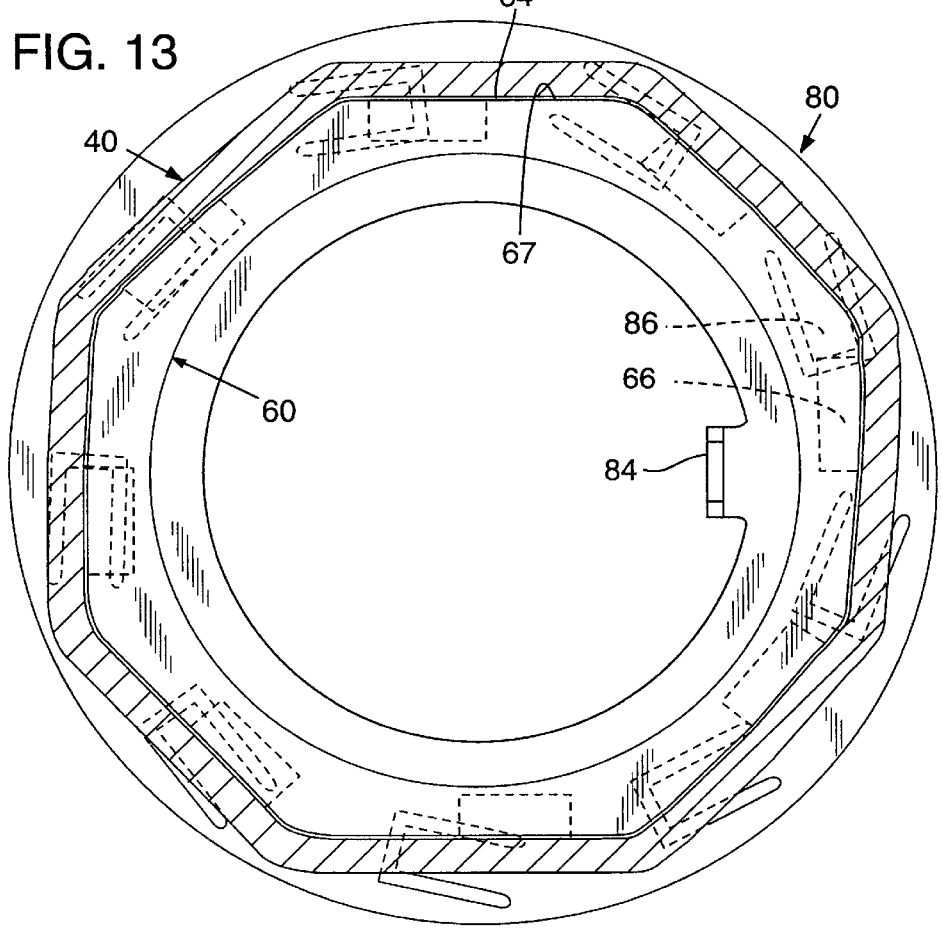

NUT AND LOCKING DEVICE

CROSS-REFERENCE TO RELATED APPLICATION

This application is a continuation-in-part of application Ser. No. 08/333,500, filed Nov. 2, 1994, issued as U.S. Pat. No. 5,618,143 which is herein incorporated by reference.

FIELD OF THE INVENTION

This invention relates to an apparatus for locking a threaded member onto another threaded member and more particularly relates to a spindle nut with a locking device for securing the nut in a rotative position on a motor vehicle wheel spindle.

BACKGROUND OF THE INVENTION

Wheel hubs of a vehicle which are rotatably bearing mounted to a wheel spindle are typically secured by a spindle nut. The nut not only secures the assembly, but also establishes a pre-load on the bearings. The nut must be secured in a fixed rotative position to maintain the pre-load desired on the bearings and for safety reasons. Should the nut loosen or in the rare instance become tightened further premature bearing failure is likely to occur. Should the nut loosen dramatically, there is the possibility of the wheel coming off the vehicle.

Locking devices are utilized to secure the nut in a fixed rotative position. Typically a locking device engages a keyway (slot) formed in the threaded portion of the spindle so that the locking device is non-rotatable relative to the spindle. One such device is a washer that is positioned between the bearings and the nut. After the nut is tightened to establish a desired pre-load on the bearings, the washer is deformed to engage a flat on the nut. This type of lock requires deformation of the washer to establish a lock and when it is desired to disassemble the hub from the spindle, the washer must be deformed again to permit the removal of the nut. The operation of bending the washer is an added operation and often, the washer is not properly deformed to establish a positive engagement with the nut.

Another device has a ring that is attachable to the nut after the nut has been installed. The ring has a protrusion that engages the keyway of the spindle so that it is non-rotatable relative to the spindle. The ring is attached to the nut by multiple fasteners such as screws. The nut must therefore, in almost all installations, be rotatably adjusted so that the fasteners may be inserted through the ring, threadably installed in the nut and tightened. The adjusting of the nut and the manual insertion and tightening of the fasteners requires additional undesired manual operations.

Examples of other devices employed to lock nuts onto threaded spindles include those shown in U.S. Pat. Nos. 2,950,944 to Cooney, 4,737,058 to Callman et al., and 4,812,094 to Grube.

BRIEF SUMMARY OF THE INVENTION

The present invention is a nut and locking device useful for securing a fixture onto a threaded shaft. In particular, the invention is especially suited to vehicle wheel spindle assemblies. The nut and locking device are readily installed or removed by the use of a tool.

In general design, the present invention comprises a nut, an antirotation spring and a spring backup plate which, when assembled in combination, secure a fixture to a threaded shaft. In the context of a vehicle wheel spindle assembly, the combination of the nut (also referred to in this context as a "spindle nut"), antirotation spring and spring backup plate, secures the wheel hub to the wheel spindle. The following summary describes the overall structure and function of the assembly in the context of a vehicle wheel spindle assembly. However, it will be appreciated that this application is but one illustration of the utility of this invention and that the invention can be used to lock a fixture onto any type of threaded shaft.

The spring backup plate and the antirotation spring have projections that engage a slot (keyway) formed in the threaded portion of the wheel spindle to prevent them from rotating relative to the spindle. The spindle nut, antirotation spring and spring backup plate are installed on the threaded end of the spindle, with the spring backup plate engaging a race of the bearings of the wheel hub. The antirotation spring has one or more axially biased spring fingers on its periphery and is positioned between and in abutment with the spindle nut and the spring backup plate. The spindle nut has a flange with slots or notches around its periphery. When the spindle nut, antirotation spring and spring backup plate are assembled, the flange of the spindle nut abuts the antirotation spring such that one or more of the spring fingers is received in one or more of the notches of the spindle nut flange. This locking arrangement is facilitated by the design of the spring fingers, which are normally biased to enter into the notches of the spindle nut flange.

A tool that has axially extending fingers that fit in the notches of the flange of the spindle nut is utilized to rotate the spindle nut for installing and removing the spindle nut from the threaded spindle end. The fingers of the tool extend into the notches of the spindle nut flange and prevent the spring fingers of the antirotation spring from entering the notches until the tool is removed. As the spindle nut is tightened, the spindle nut, antirotation spring and spring backup plate are moved into close abutment.

When the spindle nut is torqued to the desired setting, the tool is removed, allowing one or more of the spring fingers of the antirotation spring to enter one or more of the notches in the spindle nut flange. This action locks the antirotation spring to the spindle nut and, because the antirotation spring cannot rotate relative to the spindle, prevents the spindle nut from rotating relative to the spindle. If one or more of the spring fingers is not in alignment with a spindle nut notch, the spindle nut requires only a few degrees of rotation to produce proper alignment and locking.

In an alternative embodiment, the functions of the antirotation spring and spring back-up plate are combined in a lockwasher having spring tabs that are engageable with notches formed in the nut. When this two-part device is assembled on a shaft, the arrangement of the springtabs and the nut is such that the nut overlies only a portion of each springtab. This configuration permits the use of a standard tool (such as a hex wrench) to simultaneously disengage the springtabs from the nut and to removing the nut.

BRIEF DESCRIPTION OF THE DRAWINGS

FIG. 1 is an exploded view of a nut and locking device according to the present invention, along with an installing tool and a threaded shaft.

FIG. 2 is an enlarged view of a section of the system showing the relation of the nut and locking device and installation tool of FIG. 1 during installation or removal of the nut.

FIG. 3 is a view similar to FIG. 2 showing the relation of the nut and locking device after installation and with the tool removed.

FIG. 8 is a perspective view of a preferred spindle nut for use in conjunction with an antirotation spring as shown in FIGS. 4 and 6.

FIG. 9 is an enlarged cross-section view of a portion of the spindle nut of FIG. 8 as viewed on line 9—9 of FIG. 8.

FIG. 10 is an exploded view of a nut and locking device of the present invention, showing alternative embodiments of the spindle nut, antirotation spring and spring backup plate.

FIG. 11 is an enlarged view of a portion of the antirotation spring of FIG. 10 as viewed on line 11—11 of FIG. 10.

FIG. 12 illustrates and alternative embodiment of the present invention, comprising a nut and lockwasher. Also shown is an installing tool and a threaded shaft.

FIG. 13 is an enlarged cross section view of the assembled nut, lockwasher and installing tool taken along line 13—13 of FIG. 12.

DESCRIPTION OF THE INVENTION

General Description

Figure 4:
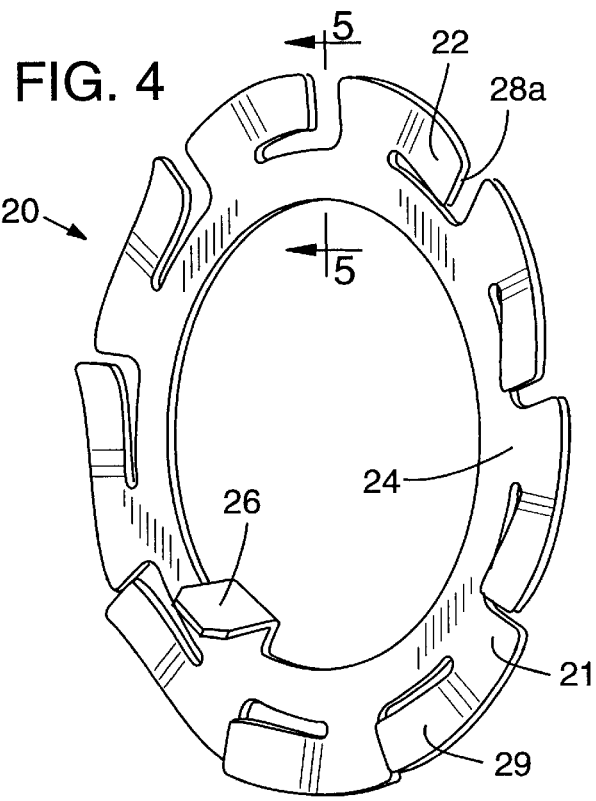
FIG. 4 is a perspective view of a preferred embodiment of the antirotation spring.

An exploded view of a spindle nut and locking device according to the present invention, together with a tool for threadedly installing the nut on a threaded portion of a spindle is shown in FIG. 1. The spindle nut and locking device comprise three components: a spindle nut 10, an antirotation spring 20 and a spring backup plate 30.

Starting with the spindle nut 10, the nut 10 as shown in FIG. 1 has internal threads 12 for engagement with the external threads 52 of the spindle 50. (The internal threads are shown in the figures as being scalloped. This scalloping feature is not required for the invention; nuts having normal, continuous internal threads may also be employed.) The body of the nut 10 has a radially extending flange 14 that has a plurality of notches (or slots) 16 formed around its periphery.

The antirotation spring 20, as shown in FIG. 1, is of a resilient spring-like metal or other suitable material and has a generally circular or disk-like configuration (although it will be recognized that other configurations are also acceptable). The antirotation spring 20 has a plurality of spring fingers 22 extending from the body 24 of the disk. The spring fingers 22 are each configured and sized to fit in a notch 16 of the radially extending flange 14 of the spindle nut 10. A leg 26 projects radially inward from the body 24 of the antirotation spring 20 and is arranged to engage the slot 54 in the spindle 50 to prevent rotation of the antirotation spring relative to the spindle. As illustrated in FIG. 1, the leg 26 is bent to extend axially relative to the body 24 of the spring 20. The axially extended portion primarily serves to assist assembly (e.g., to avoid mounting the spring backwards) and can be eliminated.

The spring backup plate 30 is also disk-like in its configuration. A projection 32 extends radially inward from the body 34 of the backup plate 30 and is arranged to engage the spindle slot 54 to prevent rotation of the spring backup plate relative to the spindle.

A tool 40 is utilized to rotate the spindle nut 10 when installing or removing the nut from a spindle. The tool 40 has a body 42 shaped much like a conventional socket wrench. The tool 40 has axially extending tool fingers 44 that extend from one end of the body 42 as shown. The tool fingers 44 are in a spaced relation and are arranged to engage the notches 16 of the spindle nut 20 when the tool 40 is applied to rotate the nut. The tool fingers 44 are of a length to extend into the notches 16 of the spindle nut 20 and to be flush with the rear face 18 of the flange 14 as best illustrated in FIG. 2. Lands 46 between adjacent axially extending tool fingers 44 of the tool 40 engage the flange 14 of the spindle nut 10 to properly position the tool fingers 44 in the notches 16. One end of the body 42 of the tool 40 is arranged to receive a driving tool. In the embodiment illustrated, the tool 40 has a hex-shaped formation 48 extending from the base 47 and in addition, the formation 48 has an internal square opening 49.

Having illustrated the general configuration of the invention in FIG. 1, FIGS. 2 and 3 illustrate the operation of the invention. As noted above, the spindle nut 10 is threadably installed on the threaded end of the spindle 50 by utilizing the tool 40. FIG. 2 shows the tool 40 in place during the operation of installing or removing the spindle nut 10 from the spindle 50. As illustrated, the axially extending tool fingers 44 of the tool 40 extend into the notches 16 of the spindle nut 10 with the ends 45 of the axially extending tool fingers 44 flush with the face 18 of the flange 14. The tool fingers 44 engage the notches 16 to provide a driving coupling between the spindle nut 10 and the tool 40. As the spindle nut 10 is engaged by the tool 40, the tool fingers 44 will force any spring finger 22 of the antirotation spring 20 that is in a notch 16 in the flange 14, out of the notch. In this position, the tool can be rotated as depicted by the double-headed arrow in FIG. 2, thereby rotating the spindle nut for installation on, or removal from, the spindle 50.

During installation, the spindle nut 10 is rotated by the tool 40 until the desired torque level has been attained. The tool 40 is then retracted from the spindle nut 10. FIG. 3 illustrates the configuration assumed by the spindle nut and lock assembly upon removal of the tool 40. As shown, the axially biased spring fingers 22 of the spring backup plate 20 are urged toward the flange 14 of the spindle nut 10. If one of the spring fingers 22 is correctly aligned with one of the notches 16 of the spindle nut 10, the end 28 of the spring finger 22 will enter the notch 16. As illustrated in FIG. 3, this will cause the antirotation spring 20 to be locked to the spindle nut 10. Because the antirotation spring 20 is non-rotatable relative to the spindle 50, owing to the projection of the leg 26 into the spindle slot 54, the net effect is to lock the spindle nut 10 into non-rotatable position relative to the spindle 50.

In the event that no spring finger 22 is aligned with a notch 16 of the spindle nut 10, a few degrees of rotation of the spindle nut 10 with the tool 40 will align one or more of the spring fingers 22 with one or more of the notches 16. In the embodiment illustrated, there are nine spring fingers 22 on the antirotation spring 20 and there are eight notches 16 in the flange 14 of the spindle nut 10. Therefore, the spindle nut 10 need only be rotated a few degrees to place a notch 16 of the nut 10 in alignment with a spring finger 22 of the antirotation spring 20. It is not necessary for more than a single spring finger 22 to be engaged in a notch 16 of the spindle nut 10 to prevent rotation of the spindle nut 10 relative to the spindle 50 under normal operating conditions in a normal vehicle hub assembly.

Having described and illustrated the general configuration and operation of the invention in the preceding paragraphs and in FIGS. 1–3, FIGS. 4–7 illustrate preferred embodiments of the antirotation spring, and FIGS. 8–9 illustrate a preferred embodiment of the spindle nut.

Figure 5:
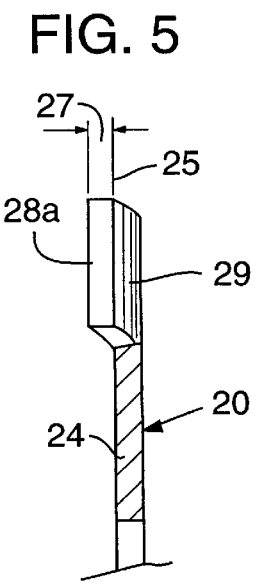
FIG. 5 is an enlarged view of a portion of the antirotation spring of FIG. 4 as viewed on line 5—5 of FIG. 4.

Referring to FIGS. 4 and 5, one preferred embodiment of the antirotation spring 20 is illustrated. This is the same as the embodiment of the antirotation spring as illustrated in FIG. 1. Essentially, the axially biased spring fingers 22 comprise a stem 21 that projects radially from the body 24 and a tab 29 that extends circumferentially from stem 21 relative to body 24 of the antirotation spring 20. A cross section drawn along line 5—5 of FIG. 4 is shown in FIG. 5. As illustrated in FIGS. 4 and 5, the tab 29 of each spring finger 22 is bent axially such that each tab has an end portion 28a that is spring-biased to fit into a notch 16 of the spindle nut 10 when the components are assembled on a spindle. As shown in FIG. 5, the biasing of the spring fingers 22 causes the end portions 28a of the tabs 29 to project beyond the plane 25 of the body 24 of the antirotation spring 20 on one side as indicated by distance 27.

Figure 6:
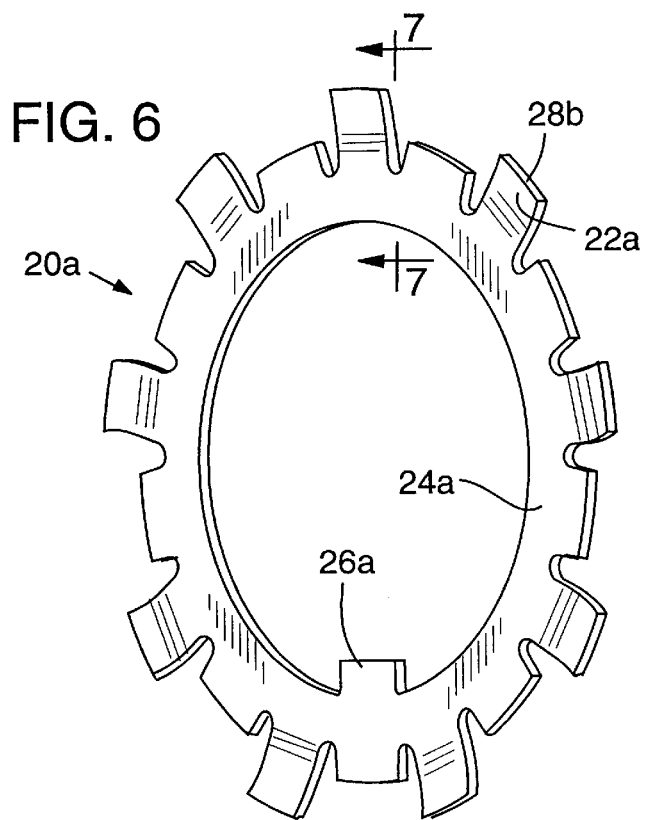
FIG. 6 is a view of an alternative embodiment of the antirotation spring.
Figure 7:
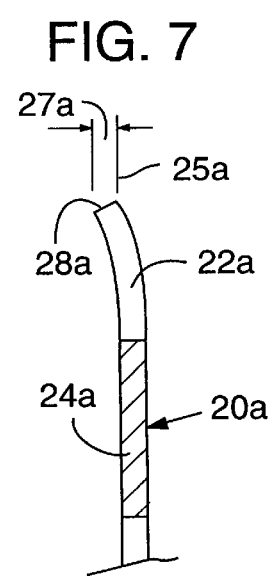
FIG. 7 is an enlarged view of a portion of the antirotation spring of FIG. 6 as viewed on line 7—7 of FIG. 6.

FIGS. 6 and 7 illustrate another preferred embodiment of the antirotation spring. In this embodiment, the spring fingers 22a project radially from the body 24a of the antirotation spring 20a. The spring fingers 22a are generally linear in configuration and the end portion 28b of each spring finger is bent axially such that each spring finger end portion 28b is biased to fit into a notch 16 of the spindle nut 10. As illustrated in FIG. 7, the bend of the spring fingers 22a causes the end portions 28b of the spring fingers to project beyond the plane 25a of the body 24a of the antirotation spring 20a on one side as indicated by distance 27a. In the embodiment of the antirotation spring illustrated in FIG. 6, the leg 26a which engages the slot 54 of the spindle 50 projects radially inward from the body 24a of the antirotation spring 20a and is arranged to engage the slot 54 and the spindle 50. As discussed above, the axially extended portion of the leg 26 primarily serves to assist assembly and can be eliminated (such as in the embodiment shown in FIG. 6).

FIGS. 8 and 9 show a preferred embodiment of a spindle nut 10A. This embodiment is preferred for use in conjunction with the preferred antirotation springs discussed above and illustrated in FIGS. 4–7. As illustrated in FIG. 8, the preferred spindle nut 10a is similar to the spindle nut 10 described above and illustrated in FIG. 1, except that in this preferred embodiment, the flange 14a that defines the notch 16a has a step 17a extending radially from the flange 14a into the notch 16a. The resulting "stepped" notch 16a receives spring fingers 22 and 22a of the preferred antirotation springs 20 and 20a respectively.

Alternative embodiments of the spindle nut, antirotation spring and spring backup plate are illustrated in FIG. 10. Turning first to the spindle nut 10, this embodiment is as shown in FIG. 1. Turning to the antirotation spring 20b shown in FIG. 10, it has multiple spring fingers 22c extending radially from the body portion 24b. The spring fingers 22c are each configured and sized to fit in a slot 16 of the spindle nut 10. As illustrated in FIGS. 10 and 11, each spring finger 22c comprises a stem 21c with a first bend 23c and a second bend 23d. The first bend 23c results in the terminal portion of the stem being at an angle to the plane of the body 24b of the spring 20b. The second bend 23d in the stem results in the tip 28c of the spring finger being bent substantially normal to the plane of the body 24b of the spring. The tip 28c projects beyond the plane of the body 24b on one side by a distance 25c. The stem 21c projects beyond the plane of the body 24b at the point of the bend 23d by a distance 27c. A leg 26c projects radially inward from the body 24b of the antirotation spring 20b.

FIG. 10 also illustrates an alternative embodiment of the spring backup plate. The spring backup plate 30b has spaced notches 36b in its periphery that mate with the rearwardly projecting portion of the spring finger 23d of the alternative embodiment of the antirotation spring 20b. A projection 32b extends radially inward from the body 34b of the spring backup plate 30b and is arranged to engage the slot 54 in the spindle 50. The projection 32b of the spring backup plate 30b and the leg 26b of the antirotation spring 20b align the spring fingers 22c of the antirotation spring 20b with the notches 36b of the spring backup plate 30b when the antirotation spring and the spring backup plate 30b are installed on a spindle or the like.

Another alternative embodiment of the present invention is exemplified by the illustration in FIGS. 12 and 13. This embodiment utilizes a simple two part locking system, comprising a nut 60 having a threaded aperture for engaging a threaded shaft 50, and a lockwasher 80. More specifically, the nut 60 has internal threads 12 for engagement with the external threads of the shaft 52. The body of the nut 60 has a radially extending flange 64 that has at least one notch 66 formed therein. In the illustrated embodiment, the notch 66 is formed by deformation of the lip 67 of the flange 64. The notch 66 is configured so as to receive a spring tab 86 of the lockwasher 80.

The lockwasher 80 has an aperture 82 for receiving the threaded shaft 50 and a leg 84 extending radially inward into the aperture 82 for engaging a longitudinal slot 54 in the threaded shaft 50. The lockwasher 80 also has at least one resiliently biased spring tab 86 projecting from the plane of the lockwasher for engaging a notch 66 of the nut 60.

The configuration of lockwasher 80 and the nut 60 is such that when the nut 60 and lockwasher 80 are assembled on a shaft, the flange 64 extends radially to cover only a portion of the width 88 of the spring tabs 86. As illustrated in FIG. 13, this configuration allows a tool, such as a conventional hex wrench, to fit over the nut 60 and to contact the springtabs 86 of the lockwasher 80.

In operation, the lockwasher 80 is placed onto a shaft against an object to be secured. The lockwasher 80 is placed with the spring tabs 86 projecting away from the object to be secured. Then, the nut 60 is threaded onto the shaft and tightened against the lockwasher 80 with a suitable tool, such as a conventional hex wrench. By application of axial force on the hex wrench in the direction of the lockwasher 80, the spring tabs 86 of the lockwasher are prevented from entering the notches 66 of the nut 60. This allows the nut to be tightened to the desired torque. Removal of the hex wrench then results in the spring tabs 86 being released and made available for engaging the notches 66 of the nut 60. If the alignment of the nut 60 and the lockwasher 80 is such that no spring tab 86 is engaged with a notch 66, a further rotation of the nut 60 by a few degrees will produce such engagement.

Those skilled in the art will recognize that modifications and variations may be made without departing from the true spirit and scope of the invention as described above. The invention therefore is not to be limited to the embodiments described and illustrated, but is to be determined from the appended claims.

What is claimed is:

1. A nut and locking device for securing a nut in position on a threaded shaft comprising:

a nut having a threaded aperture for engaging the threads on the shaft whereby rotation of the nut in one direction moves the nut onto the shaft and reverse rotation moves the nut off of the shaft, the nut having at least one notch formed therein;

a spring having an aperture for receiving the shaft and mated to the shaft to permit axial movement and prevent rotation of the spring relative to the shaft, the spring defining a plane against which the nut is received as the nut is rotated onto the shaft;

at least one resilient spring finger integrally formed in the spring and resiliently biased out of the plane toward the nut so as to engage the notch and prevent reverse rotation of the nut relative to the shaft.

2. A nut and locking device as defined in claim 1 wherein the spring finger is directed circumferentially in the direction of rotation that moves the nut onto the shaft whereby the spring finger is cammed away from the notch when turning the nut onto the shaft and engages the notch when turning the nut off of the shaft.

3. A nut and locking device as defined in claim 2 wherein the notch is an inset in the nut and restricts the projection of the spring finger onto the notch.

4. A nut and locking device as defined in claim 1 wherein multiple spring fingers are provided on the spring and multiple notches are provided on the nut, said notches and fingers at varying peripheral positions to provide a finger and notch mating at different incremental rotative positions.

5. A nut and locking device as defined in claim 1 wherein the spring finger is directed axially toward the nut to prevent movement of the nut onto and off of the shaft.

6. A system for securing a nut in a rotative position on a shaft having a longitudinal slot in a threaded end, comprising:

a spring having an aperture for receiving the shaft, the spring having one or more spring fingers extending therefrom and a leg extending radially inward into the aperture for engaging the longitudinal slot of the shaft;

a nut having internal threads for engagement with the threaded end of the shaft, the nut having one or more notches formed therein, the notches configured and arranged to receive the spring fingers of the spring; and a tool moveable from an engaged position in which the tool engages the nut to allow rotation thereof and in which position the tool occupies the notches to prevent entry of the spring fingers into the notches, to a disengaged position in which at least one spring finger engages a notch so as to prevent rotation of the nut relative to the shaft.

7. The system of claim 6, wherein the device further includes:

a spring backup plate having an aperture for receiving the shaft, said plate having a projection extending into the aperture for engaging the longitudinal slot of the shaft, the plate positioned on the shaft adjacent to the spring, with the spring positioned between the plate and the nut.

8. The system of claimed 6 wherein the spring fingers on the spring and the notches in the nut are unequal in number.

9. An apparatus for locking a nut onto a spindle having a longitudinal slot in a threaded end, comprising:

a nut having an internal thread such that the nut is threadably mountable on the spindle, the nut having a peripheral flange with notches formed in the flange;

a locking spring mountable on the spindle adjacent to the flange of the nut, the spring having a plurality of spring fingers projecting therefrom, each spring finger having an end that is biased towards the flange of the nut, the spring fingers configured to fit into the notches of the nut and wherein the spring has a leg extending radially inward, the leg configured to be received in the slot of the spindle; and a plate mountable on the spindle adjacent to the locking spring, the plate having a projection extending radially inward and configured to be received in the slot of the spindle.

10. The apparatus of claim 9 further comprising a tool for adjusting the apparatus, the tool comprising a body having fingers projecting from an edge surface of the tool, the fingers being equal in number to the number of notches in the flange of the nut, and configured to prevent entry of the spring fingers into the notches when the tool is engaged with the nut.

11. The apparatus of claim 10 wherein the tool further comprises lands on the edge surface of the body, the lands defining a maximum depth to which the fingers of the tool can be inserted into the notches of the nut.

12. The apparatus of claim 9 wherein the notches formed in the flange of the nut include a step projecting from the flange into the notch.

13. The apparatus of claim 9 wherein the spring fingers of the locking spring project radially from the body of the locking spring and are generally linear in configuration.

14. The apparatus of claim 9 wherein the spring fingers of the locking spring comprise a stem that projects radially from the body of the locking spring, and a tab that extends circumferentially from the stem, the tab forming the biased end of the spring finger.

15. A system for securing a wheel hub having bearings onto a wheel spindle having a longitudinal slot formed in a threaded end comprising:

an internally threaded nut securing the wheel hub to the spindle, the nut having a peripheral flange and wherein a plurality of stepped notches are formed in the flange;

a disk shaped locking spring comprising a spring body from which projects a plurality of spring fingers each having a peripheral end, said end biased axially relative to the spindle and configured to fit into a notch in the flange of the nut, and wherein the spring has a leg extending radially inward, the leg configured to be received in the slot of the spindle;

a spring backup plate comprising a plate body and, extending radially inward from the plate body, a projection configured to be received in the slot of the spindle; and a tool comprising a tool body having fingers projecting from an edge surface of the tool, the fingers being equal in number to the number of notches in the flange of the nut, and configured to prevent entry of the ends of the spring fingers into the notches when the tool is engaged with the nut.

16. The system of claim 15 wherein the spring fingers of the locking spring project radially from the body of the locking spring and are generally linear in configuration.

17. The system of claim 15 wherein the spring fingers of the locking spring each comprise a stem projecting radially from the body of the locking spring, and, on the end of the stem, a tab that extends circumferentially from the stem, the tab forming the biased end of the spring finger.

18. A method of securing a wheel hub to a wheel spindle comprising the steps of:

providing a system as defined in claim 12;

introducing the wheel hub onto the spindle;

positioning the spring backup plate on the spindle adjacent to the bearings of the wheel hub, such that the projection is engaged in the slot of the spindle;

positioning the locking spring on the spindle adjacent to the spring backup plate, such that the leg is engaged in the slot of the spindle;

positioning the nut on the spindle adjacent to the locking spring;

engaging the nut with the tool such that the tool fingers are received in the notches of the nut;

rotating the tool to tighten the nut, locking spring and spring backup plate against the bearings of the wheel hub until a desired load is established against the bearings; and removing the tool such that at least one of the spring fingers is received within at least one of the notches, thereby locking the assembly onto the spindle.

19. A method of securing a nut in position on a threaded spindle comprising the steps of:

placing a spring having an aperture for receiving the spindle onto the spindle such that the spring cannot rotate relative to the spindle, the spring defining a first plane that is generally normal to a longitudinal axis of the spindle;

providing at least one spring finger on the spring, the spring finger being biased so as to extend from the first plane;

threading a nut having a first side onto the spindle such that the first side abuts the first plane, the nut having at least one notch open to the first side;

placing a tool in the notch to press the spring finger toward the first plane as the nut is threaded onto the spindle; and removing the tool from the notch to allow the spring finger to extend from the first plane and engage the slot so as to prevent rotation of the nut relative to the spindle.

* * * * *